US007315600B2

(12) United States Patent
Sigurdsson et al.

(10) Patent No.: US 7,315,600 B2
(45) Date of Patent: Jan. 1, 2008

(54) ASYNCHRONOUS FIFO APPARATUS AND METHOD FOR PASSING DATA BETWEEN A FIRST CLOCK DOMAIN AND A SECOND CLOCK DOMAIN AND A SECOND CLOCK DOMAIN OF A DATA PROCESSING APPARATUS

(75) Inventors: Karl Jon Sigurdsson, Cambridge (GB); Andrew Brookfield Swaine, Cambridge (GB); Scott Alexander Wilson, Cambridge (GB)

(73) Assignee: ARM Limited, Cambridge (GB)

( * ) Notice: Subject to any disclaimer, the term of this patent is extended or adjusted under 35 U.S.C. 154(b) by 725 days.

(21) Appl. No.: 10/812,310

(22) Filed: Mar. 30, 2004

(65) Prior Publication Data

US 2005/0220239 A1 Oct. 6, 2005

(51) Int. Cl.
 *H04L 7/00* (2006.01)
(52) U.S. Cl. ..................................... 375/372
(58) Field of Classification Search ........... 375/371, 375/372, 373, 376; 711/200, 155, 154
 See application file for complete search history.

(56) References Cited

U.S. PATENT DOCUMENTS 5,619,713 A * 4/1997 Baum et al. ............... 707/102

OTHER PUBLICATIONS

Chau et al., "A 6.4 GBPS FIFO Design for 8-32 Two-Way Data Exchange Bus," IEEE, 2002, pp. 772-775.*

* cited by examiner

*Primary Examiner*—Tesfaldet Bocure
(74) *Attorney, Agent, or Firm*—Nixon & Vanderhye P.C.

(57) ABSTRACT

An asynchronous FIFO apparatus includes a main FIFO memory, operable to store the data to be passed between the first and second clock domains, accessible from each clock domain under the control of an access pointer associated with that clock domain. For one or both of the clock domains, the amount of data accessible per clock cycle is variable. An auxiliary FIFO memory is associated with each clock domain in which the amount of data accessible per clock cycle is variable, and operable to store the access pointer used to access the main FIFO memory from its associated clock domain, and the access pointer being stored at a location of the auxiliary FIFO memory specified by an auxiliary access pointer. Routing logic passes the auxiliary access pointer to the other clock domain to enable that other clock domain to retrieve the access pointer stored in the auxiliary FIFO memory.

20 Claims, 7 Drawing Sheets

ASYNCHRONOUS FIFO APPARATUS AND METHOD FOR PASSING DATA BETWEEN A FIRST CLOCK DOMAIN AND A SECOND CLOCK DOMAIN AND A SECOND CLOCK DOMAIN OF A DATA PROCESSING APPARATUS

BACKGROUND OF THE INVENTION

1. Field of the Invention

The present invention relates to asynchronous FIFO (First-In-First-Out) memories, and in particular to an improved asynchronous FIFO apparatus and method for passing data between a first clock domain and a second clock domain of a data processing apparatus.

2. Description of the Prior Art

It is known to use an asynchronous FIFO memory to pass data between first and second clock domains in a data processing apparatus, for example a microchip design/implementation, such an approach typically being used if the first clock domain is asynchronous with respect to the second clock domain (i.e. the clock frequency in the first clock domain is asynchronous with respect to the clock frequency in the second clock domain).

However, current designs of asynchronous FIFO memories only operate correctly if there are a constant number of input bits of data into the FIFO memory (herein the term "FIFO" will sometimes be used as an abbreviation for "FIFO memory") in each clock cycle in which it is desired to write data to the FIFO. Similarly, on the output side of the FIFO, current designs of asynchronous FIFOs only work if there is a constant number of output bits of data from the FIFO in each clock cycle in which it is desired to read data from the FIFO.

This restriction is required due to the asynchronous nature of the two clock domains, and the need to ensure that any pointer value passed between the two clock domains will be correctly read in the target domain. In particular, considering the example of the write side of the FIFO, if a constant number of input bits (say for example one byte) is written into the FIFO during a particular clock cycle, then this enables the write pointer to the incremented by a predetermined amount (in this example one). A gray coding process can then be applied to the write pointer before it is passed into the read domain, and because the write pointer is always incremented by the same predetermined amount, this will ensure that the gray coded write pointer only differs from its previous value by one bit. This ensures that when that gray coded write pointer is sampled in the read domain, it is only possible for the read domain to either get the correct current value, or the previous value, of the write pointer, thus avoiding any mis-reading of the write pointer. Accordingly, it is then possible in the read domain to correctly read the associated data from the FIFO.

It is important to note that the above gray coding process only works correctly when a constant number of bits of data are written into the FIFO in each cycle in which it is desired to write data, since otherwise more than one bit of the gray coded write pointer could be different from the previous gray coded write pointer, which will compromise the integrity of the value read in the read domain. For example, in the above instance, given the asynchronous nature of the read clock domain to the write clock domain, it may be the case that when the read clock domain samples the gray coded write pointer, only one of the bits will have changed, which the read domain would then interpret as a valid gray coded write pointer, even though it is in fact incorrect.

Due to recent developments in data processing designs, it is becoming more commonplace for different asynchronous clock domains to exist within a data processing apparatus. As an example, there has recently been much development in the area of Intelligent Energy Management (IEM), where the voltage supply to particular components of a data processing apparatus may be reduced during periods of inactivity in order to save energy consumption within the data processing apparatus. The implementation of such IEM techniques can give rise to the presence of multiple asynchronous clock domains within the design of a particular data processing apparatus. Whilst current asynchronous FIFO designs can be used to pass data between these differing clock domains in situations where the above constraints on input bits of data and output bits of data are observed, there are a number of instances where certain elements of the data processing apparatus will produce data in a non-constant, or bursty, manner, and current asynchronous FIFO designs will not enable such data to be passed between two asynchronous clock domains, due to the earlier described restrictions required by such asynchronous FIFO designs.

Accordingly, it is an object of the present invention to provide an improved asynchronous FIFO design which alleviates the above-mentioned problems.

SUMMARY OF THE INVENTION

Viewed from a first aspect, the present invention provides an asynchronous FIFO apparatus for a data processing apparatus having a first clock domain and a second clock domain, the first clock domain being asynchronous with respect to the second clock domain, the asynchronous FIFO apparatus being operable to pass data between the first clock domain and the second clock domain and comprising: a main FIFO operable to store said data to be passed between the first clock domain and the second clock domain, the main FIFO being accessible from each of the first clock domain and the second clock domain under the control of an access pointer associated with that clock domain, for one of said first and second clock domains the amount of data accessible per clock cycle being variable; an auxiliary FIFO associated with said one of said first and second clock domains and operable to store the access pointer used to access the main FIFO from that clock domain, the access pointer being stored at a location of the auxiliary FIFO specified by an auxiliary access pointer; and routing logic operable to pass the auxiliary access pointer to the other of said first and second clock domains to enable that other of the first and second clock domains to retrieve the access pointer stored in the auxiliary FIFO.

In accordance with the present invention, an asynchronous FIFO apparatus is provided which includes a main FIFO for storing data to be passed between a first clock domain and a second clock domain, and an auxiliary FIFO associated with one of the domains in which the amount of data accessible per clock cycle in the main FIFO is variable. In particular, for that clock domain, the auxiliary FIFO is used to store the access pointer used to access the main FIFO, this access pointer being stored at a location of the auxiliary FIFO specified by an auxiliary access pointer. Then, in accordance with the present invention, routing logic is used to pass the auxiliary access pointer to the other clock domain to enable that other clock domain to retrieve the access pointer stored in the auxiliary FIFO.

Since the amount of data accessible per clock cycle in the main FIFO is variable, this means that the associated changes in the access pointer for the main FIFO are also variable. However, the present invention takes advantage of the fact that even if the changes to the access pointer are variable, the access pointer itself will always be specified by a constant number of bits, and accordingly if the access pointer is stored in the auxiliary FIFO, then the auxiliary access pointer can always be incremented by a constant amount. Accordingly, this enables the auxiliary access pointer to be passed between the two clock domains in a manner which allows it to be accurately sampled in the recipient clock domain.

It will be appreciated that, depending on the number of locations within the auxiliary FIFO, and the way in which the auxiliary access pointers are arranged, it may be possible to constrain the auxiliary access pointers so that any incremented auxiliary access pointer only differs from its previous value by one bit, in which event the auxiliary access pointer can be directly passed by the routing logic to the other clock domain. However, in one embodiment, the routing logic performs a coding on the auxiliary access pointer in order to generate a coded auxiliary access pointer for passing to the other of said first and second clock domains. The coding is chosen in such a way as to ensure that any new coded auxiliary access pointer only differs from a preceding coded auxiliary access pointer by one bit, thus ensuring integrity in the reading of the coded auxiliary access pointer by the recipient clock domain.

In one particular embodiment, the routing logic performs a gray coding operation on the auxiliary access pointer in order to generate a gray coded auxiliary access pointer. It has been found that gray coding is a particularly efficient technique for coding the auxiliary access pointer so that when that pointer is sampled in the recipient clock domain, it is only possible for it to be either the current value or the previous value of the gray coded auxiliary access pointer.

It will be appreciated that the manner in which the asynchronous FIFO apparatus interfaces between the first clock domain and the second clock domain can take a variety of forms. However, in one embodiment, the main FIFO is accessible from the first clock domain under the control of a write access pointer in order to write data into the main FIFO, and the main FIFO is accessible from the second clock domain under the control of a read access pointer in order to read data from the main FIFO. Hence, in this embodiment, data is written into the FIFO from elements of the data processing apparatus provided in the first clock domain, and then data is read from the FIFO by elements of the data processing apparatus provided in the second clock domain.

It will be appreciated that the clock domain in which the amount of data accessible per clock cycle in the main FIFO is variable can be either the first clock domain, the second clock domain, or indeed both clock domains.

In one embodiment, for said first clock domain the amount of data writeable into the main FIFO per clock cycle is variable; the auxiliary FIFO is a write pointer FIFO operable to store the write access pointer used to access the main FIFO from the first clock domain; and the routing logic is operable to pass the auxiliary access pointer to the second clock domain to enable the second clock domain to retrieve the write access pointer stored in the write pointer FIFO; the asynchronous FIFO apparatus further comprising read logic in the second clock domain and operable in response to the write access pointer to cause the associated data stored in the main FIFO to be read. Hence, in accordance with this embodiment, write pointers are stored in the auxiliary FIFO, and routing of the auxiliary access pointer to the second clock domain enables the write access pointer to be retrieved, and for read logic in the second clock domain to then cause the associated data stored in the main FIFO to be read.

In an alternative embodiment, for said second clock domain the amount of data readable from the main FIFO per clock cycle is variable; the auxiliary FIFO is a read pointer FIFO operable to store the read access pointer used to access the main FIFO from the second clock domain; and the routing logic is operable to pass the auxiliary access pointer to the first clock domain to enable the first clock domain to retrieve the read access pointer stored in the read pointer FIFO; the asynchronous FIFO apparatus further comprising write control logic in the first clock domain and operable in response to the read access pointer to determine whether the main FIFO is full.

In accordance with this embodiment, a read access pointer is stored within the auxiliary FIFO, and routing of the auxiliary access pointer to the first clock domain enables the read access pointer to be retrieved, and for write control logic in the first clock domain to then determine, in response to the read access pointer, whether the main FIFO is full. Typically, if the main FIFO is full, the write control logic will prevent any new data being written into the main FIFO until space is available, in order to avoid any data being overwritten in the main FIFO that has not yet been read in the second clock domain.

In an alternative embodiment, for both of said first and second clock domains the amount of data accessible per clock cycle is variable, the auxiliary FIFO comprising first and second auxiliary FIFOs, each with associated routing logic; the first auxiliary FIFO being a write pointer FIFO operable to store the write access pointer used to access the main FIFO from the first clock domain, and its associated routing logic being operable to pass the auxiliary access pointer of the write pointer FIFO to the second clock domain to enable the second clock domain to retrieve the write access pointer stored in the write pointer FIFO; the asynchronous FIFO apparatus further comprising read logic in the second clock domain and operable in response to the write access pointer to cause the associated data stored in the main FIFO to be read; the second auxiliary FIFO being a read pointer FIFO operable to store the read access pointer used to access the main FIFO from the second clock domain, and its associated routing logic being operable to pass the auxiliary access pointer of the read pointer FIFO to the first clock domain to enable the first clock domain to retrieve the read access pointer stored in the read pointer FIFO; the asynchronous FIFO apparatus further comprising write control logic in the first clock domain and operable in response to the read access pointer to determine whether the main FIFO is full.

In accordance with this embodiment, both a write pointer FIFO and a read pointer FIFO are provided, each having associated routing logic, this hence enabling write pointers to be reliably passed between the first and second clock domains via an associated auxiliary access pointer, and also for read access pointers to be reliably passed from the second clock domain to the first clock domain via associated auxiliary access pointers. In this embodiment, both the amount of data writeable to the main FIFO per clock cycle is variable, and the amount of data readable from the main FIFO per clock cycle is variable.

Viewed from a second aspect, the present invention provides a data processing apparatus comprising: a first element operating in a first clock domain; a second element operating in a second clock domain; and an asynchronous FIFO apparatus in accordance with the first embodiment of the present invention, operable to pass data between the first element and the second element.

In one particular embodiment, the data processing apparatus further comprises: a trace module operable to produce trace data indicative of the activity of the first element, the trace module including said asynchronous FIFO apparatus; wherein the main FIFO is accessible from the first clock domain under the control of a write access pointer in order to write into the main FIFO the trace data, and the main FIFO is accessible from the second clock domain under the control of a read access pointer in order to read from the main FIFO the trace data for passing to the second element. Hence, in accordance with this embodiment, an asynchronous FIFO apparatus is provided within a trace module, with the data stored within the main FIFO being trace data. In one particular implementation of such an embodiment, the first element may be a processor core, and the second element may be a trace buffer used to store trace data prior to output to a trace analysis tool.

In one embodiment, a power supply voltage to the first element is variable, and a clock frequency of the first clock domain is operable to change in dependence on the power supply voltage. In one particular implementation of such an embodiment, the data processing apparatus may incorporate Intelligent Energy Management (IEM) logic which enables the power supply voltage to the first element to be reduced when the first element is less busy, in order to provide energy consumption savings. This variation in the power supply voltage has a knock-on effect on the clock frequency within the first clock domain, and this in turn causes a variation in the rate of writing of trace data into the main FIFO.

Viewed from a second aspect, the present invention provides a method of passing data between a first clock domain and a second clock domain of a data processing apparatus, the first clock domain being asynchronous with respect to the second clock domain, the method comprising the steps of: (a) storing within a main FIFO said data to be passed between the first clock domain and the second clock domain, the main FIFO being accessible from each of the first clock domain and the second clock domain under the control of an access pointer associated with that clock domain, for one of said first and second clock domains the amount of data accessible per clock cycle being variable; (b) storing within an auxiliary FIFO associated with said one of said first and second clock domains the access pointer used to access the main FIFO from that clock domain, the access pointer being stored at a location of the auxiliary FIFO specified by an auxiliary access pointer; (c) passing the auxiliary access pointer to the other of said first and second clock domains; and (d) retrieving, at the other of the first and second clock domains, the access pointer stored in the auxiliary FIFO.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
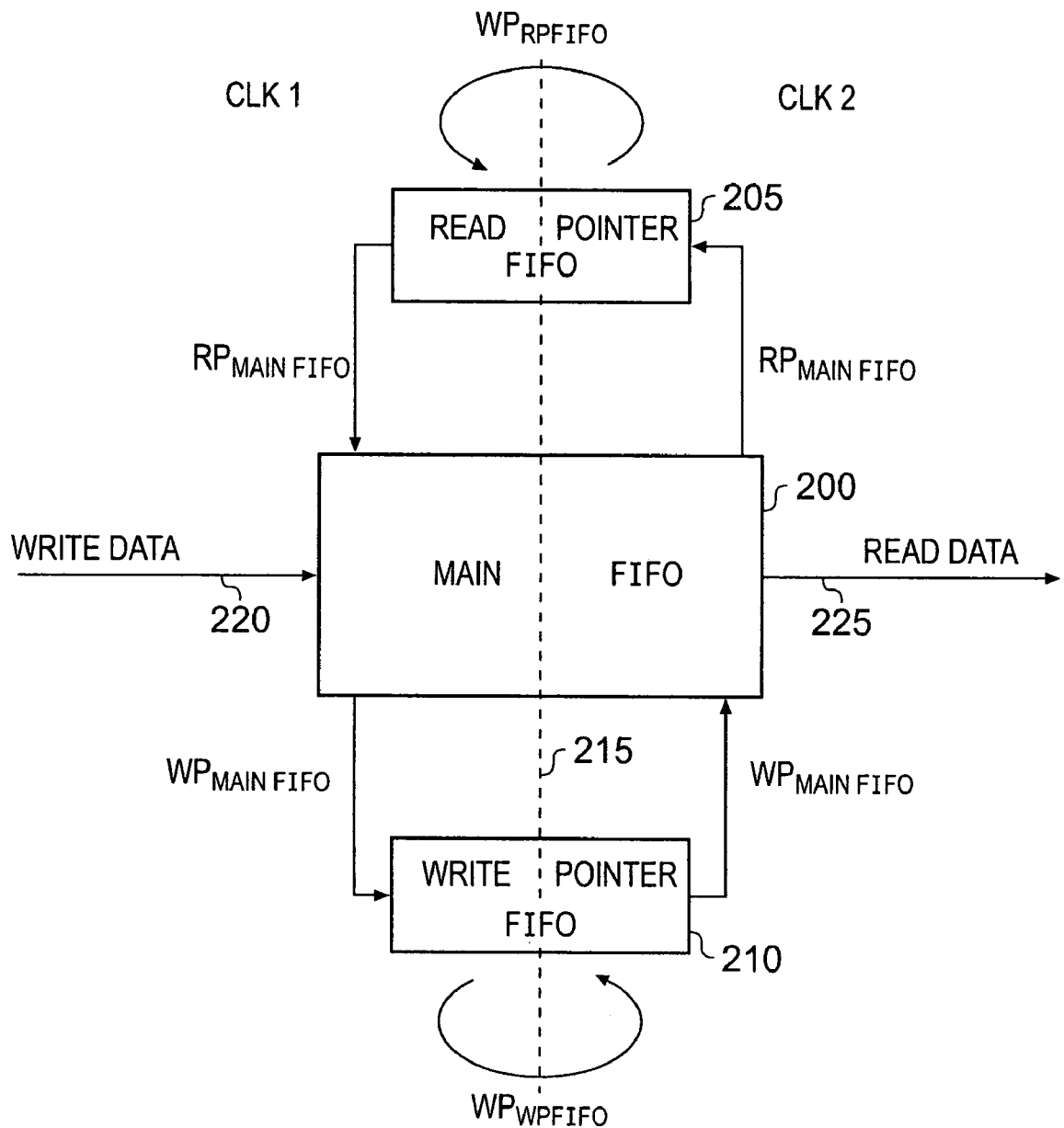
FIG. 1 is a diagram schematically illustrating an asynchronous FIFO apparatus in accordance with one embodiment of the present invention.

FIG. 1 illustrates an asynchronous FIFO apparatus in accordance with one embodiment of the present invention. This asynchronous FIFO apparatus includes a main FIFO 200 for storing data written into the main FIFO over path 220, and from which data can subsequently be read over path 225. Data is written into the main FIFO 200 in the first clock domain (CLK1) and data is read from the main FIFO 200 in the second clock domain (CLK2), the dotted line 215 in FIG. 1 schematically illustrating the demarcation between the first and second clock domains.

Data stored into the main FIFO 200 over path 220 is stored at locations within the FIFO indicated by a write pointer $WP_{MAINFIFO}$. As data is written into a location specified by a particular $WP_{MAINFIFO}$ value, then that $WP_{MAINFIFO}$ value is written into the write pointer FIFO 210 at a location indicated by a write pointer for that write pointer FIFO, this write pointer being referred to hereafter as $WP_{WPFIFO}$. This $WP_{WPFIFO}$ value is then subjected to gray coding, and passed from the first clock domain to the second clock domain, where it is then ungray coded in order to identify the location in the write pointer FIFO 210 containing the write pointer $WP_{MAINFIFO}$. This $WP_{MAINFIFO}$ value can then be used to access the associated data value in the main FIFO 200 to enable it to be read out over path 225.

Through the provision of this logic, it does not matter if the amount of data written into the main FIFO in any particular clock cycle varies, since whilst this will cause the incrementation between $WP_{MAINFIFO}$ values to vary, each $WP_{MAINFIFO}$ value will be of the same size, and accordingly as each $WP_{MAINFIFO}$ value is stored into the write pointer FIFO 210, the $WP_{WPFIFO}$ value will be incremented by the same predetermined amount each time. Accordingly, this value can be reliably passed from the first clock domain to the second clock domain without any risk of being misread by the second clock domain due to the asynchronous nature of the first and second clock domains.

Similarly, on the read side, a read pointer FIFO 205 is provided for storing read pointer values used to access particular locations within the main FIFO 200. In particular, when data is read from the main FIFO 200, the associated read pointer value, hereafter referred to as $RP_{MAINFIFO}$ is passed to the read pointer FIFO 205, where it is stored in the location indicated by a write pointer for the read pointer FIFO, hereafter referred to as $WP_{RPFIFO}$. Again, although the amount of data read from the main FIFO 200 may vary, and accordingly the changes in the $RP_{MAINFIFO}$ may vary, the changes in the $WP_{RPFIFO}$ value will be by a constant, predetermined, value each time, and accordingly the $WP_{RPFIFO}$ value can reliably be passed from the second clock domain to the first clock domain.

This then enables the $RP_{MAINFIFO}$ value stored in the read pointer FIFO 205 to be retrieved and used to determined whether the main FIFO 200 is full. This will be the case if, when the next block of data is to be written into the main FIFO 200, the size of that data, when added to the difference between the $RP_{MAINFIFO}$ value and the current $WP_{MAINFIFO}$ value, exceeds the size of the main FIFO 200.

Figure 2:
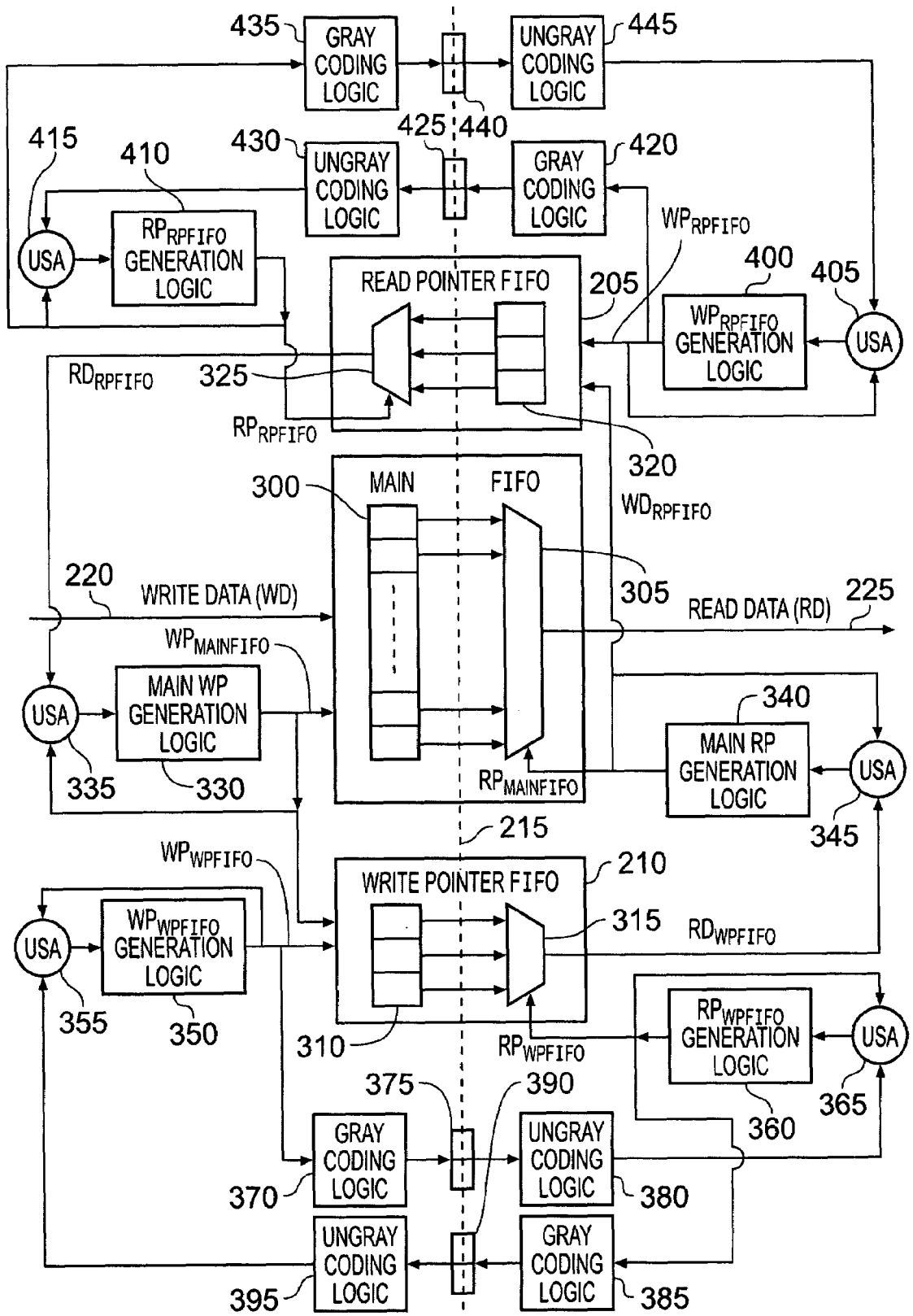
FIG. 2 is a block diagram illustrating in more detail the asynchronous FIFO apparatus of one embodiment of the present invention.

A more detailed description of the asynchronous FIFO apparatus of FIG. 1 will now be provided with reference to FIG. 2, the operation of the asynchronous FIFO apparatus of FIG. 2 being described with reference to the flow diagram of FIGS. 3A to 3D. As shown in FIG. 2, each FIFO has write pointer generation logic and read pointer generation logic associated therewith. In particular, the main FIFO 200 has associated therewith the main write pointer generation logic 330 and the main read pointer generation logic 340, the write pointer FIFO 210 has the $WP_{WPFIFO}$ generation logic 350 and the $RP_{WPFIFO}$ generation logic 360 associated therewith, and the read pointer FIFO 205 has the $WP_{RPFIFO}$ generation logic 400 and the $RP_{RPFIFO}$ generation logic 410 associated therewith.

Figure 3A:
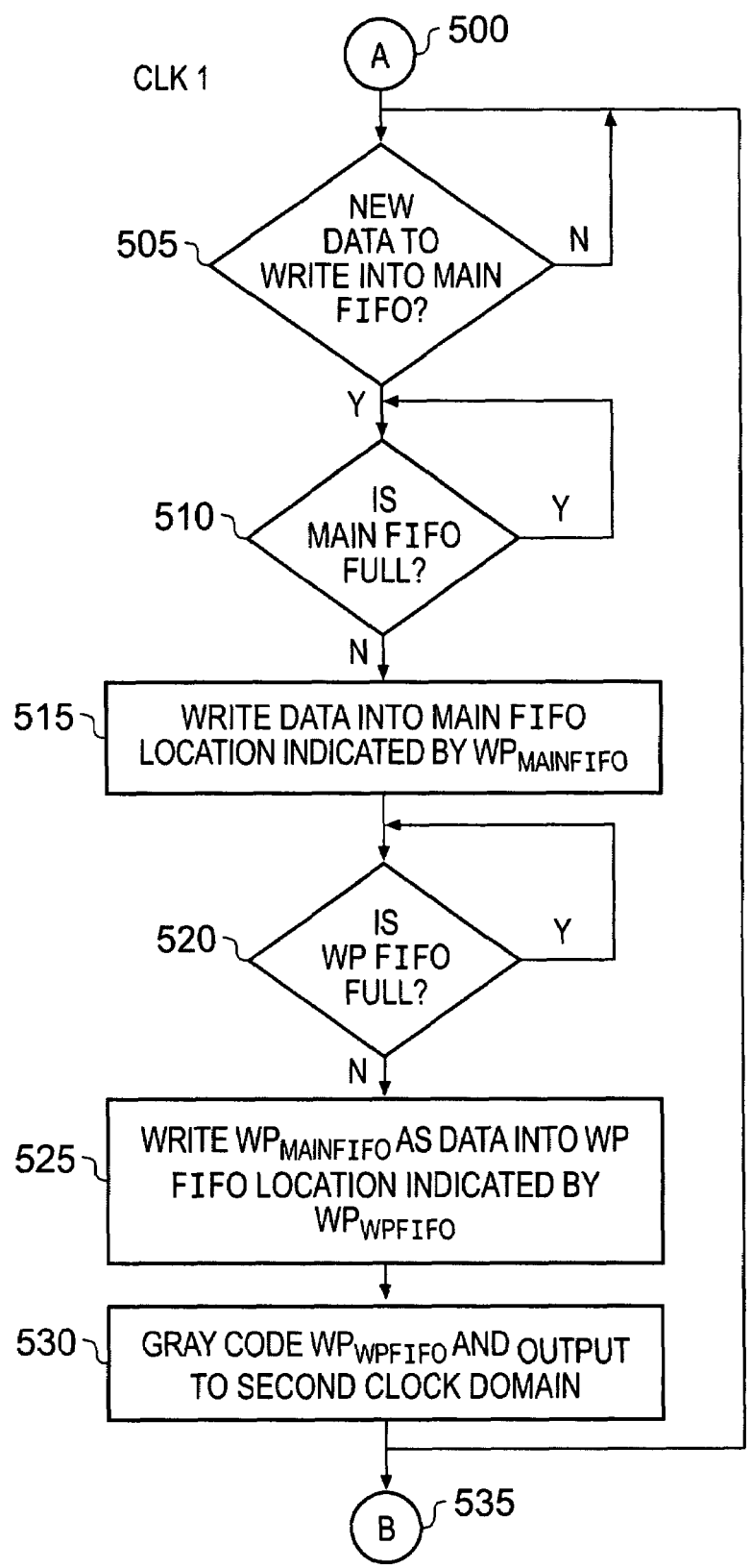
FIGS. 3A to 3D are flow diagrams illustrating the operation of the asynchronous FIFO apparatus of FIG. 2.

FIGS. 3A to 3D are flow diagrams showing a loop of processing performed by the logic of FIG. 2. FIG. 3A shows a sequence of processing performed within the first clock domain CLK1. The process starts at point 500, and proceeds to step 505, where it is determined by the main write pointer generation logic 330 whether there is new data to be written into the main FIFO 200 over path 220. If not, the process waits at step 505 until there is new data to be written. Then, the process proceeds to step 510, where the main write pointer generation logic 330 determines whether the main FIFO is full. As can be seen from FIG. 2, the main write pointer generation logic 330 receives an input signal from the logic element 335, which performs an unlike-signed addition operation on its two input signals, these input signals being the current value of $WP_{MAINFIFO}$ and the data read from the read pointer FIFO 205. As will be discussed later, this data read from the read pointer FIFO 205 actually provides a value of $RP_{MAINFIFO}$, and accordingly by performing an unlike-signed addition on the $WP_{MAINFIFO}$ value and the $RP_{MAINFIFO}$ value, this provides an indication as to the number of bytes stored in the main FIFO 200 which have not yet been read. The main write pointer generation logic 330 will also receive information concerning the number of bytes of data for the current data block to be written into the main FIFO. This value is then added to the output from the unlike-signed addition logic 335, and the main write pointer generation logic 330 will conclude that the main FIFO 200 is not full as long as the computed value does not exceed the capacity of the main FIFO 200.

If it is determined at step 510 that the main FIFO is full, then the process waits at step 510 until it is determined that the main FIFO is no longer full, i.e. because in the interim period sufficient data has been read out from the main FIFO 200.

Once it is determined that the main FIFO is not full, the process proceeds to step 515, where the write data on path 220 is written into one or more of the registers 300 of the main FIFO starting at a register location indicated by the value of $WP_{MAINFIFO}$. This value of $WP_{MAINFIFO}$ is generated by the main write pointer generation logic 330, and is output to the main FIFO 200 and also forwarded as write data to the write pointer FIFO 210.

Then, at step 520, the $WP_{WPFIFO}$ generation logic 350 determines whether the write pointer FIFO 210 is full, this analysis taking place in an analogous way to that described earlier with reference to the main write pointer generation logic 330. Hence, the unlike-signed addition logic 355 receives as one input the current value of $WP_{WPFIFO}$, and receives as the other input the current value of the $RP_{WPFIFO}$, this value having been routed from the second clock domain to the first clock domain via the gray coding logic 385 the two metastability synchronisation registers 390, and the ungray coding logic 395. As illustrated schematically in FIG. 2, the write pointer FIFO 210 of FIG. 2 has three storage registers 310, and accordingly there are three possible values for the read pointer. In one embodiment, the gray coding logic 385 produces the following gray codings dependent on the value of the read pointer:

TABLE 1

| Encoding[p] | Encoding[p-1:0]<br>(Read Pointer) | Gray Code[p:0] |
|---|---|---|
| 0 | 000 = 0 | 0000 |
| 0 | 001 = 1 | 0010 |
| 0 | 010 = 2 | 0011 |
| 1 | 000 = 0 | 1101 |
| 1 | 001 = 1 | 1001 |
| 1 | 010 = 2 | 1011 |

As can be seen from Table 1, the read pointer may have the values 000, 001 or 010, identifying locations 0, 1 or 2 of the write pointer FIFO 210. These values get gray coded by the gray coding logic 385 to form the lower three bits of a gray coded value, with the most significant bit then taking either a value 0 or a value 1 depending on an encoding bit. This encoding bit is changed to show which loop through the write pointer FIFO 210 is occurring, and hence assuming that the read pointer is initially at location 0, this encoding bit will remain as a 0 value as the location of the read pointer steps through locations 0, 1 and 2, after which a further increment of the read pointer will return it to location 0, but at this point the encoding bit for the most significant bit will change to a 1 value. The encoding bit will then remain at 1 whilst the read pointer increments through locations 0, 1 and 2, and when the read pointer is subsequently incremented to return to location 0, this encoding bit will then return to 0 for the next iteration. This final encoding bit hence enables a determination to be made when comparing the write pointer and the read pointer as to whether the write pointer is ahead of the read pointer, or the read pointer is ahead of the write pointer.

The gray coded value produced by the gray coding logic 385 is routed into the first clock domain via the metastability synchronisation registers 390, whereafter the ungray coding logic 395 then decodes the gray coded value in order to output the value of the $RP_{WPFIFO}$ to the unlike-signed addition logic 355.

The $WP_{WPFIFO}$ generation logic 350 hence receives a signal indicating the difference between the $WP_{WPFIFO}$ and the $RP_{WPFIFO}$ values. Provided that that value is two or less, the $WP_{WPFIFO}$ generation logic hence knows that is has sufficient space to write the new write data (i.e. the current value of $WP_{MAINFIFO}$) into the write pointer FIFO 210, and accordingly can conclude that the write pointer FIFO 520 is not full.

If the write pointer FIFO is determined to be fall, the process waits at step 520 until there is sufficient space to write the new data into a location of the write pointer FIFO 210, but once it is determined that the write pointer FIFO 210 is not full, the process proceeds to step 525, where the $WP_{MAINFIFO}$ value is written as data into one of the registers 310 of the write pointer FIFO at a location indicated by $WP_{WPFIFO}$. The $WP_{WPFIFO}$ value is output by the $WP_{WPFIFO}$ generation logic 350.

The process then proceeds to step 530, where the $WP_{WPFIFO}$ value is gray coded by the gray coding logic 370, and then output to the second clock domain via the two metastability synchronisation registers 375. The process then proceeds to point 535 and in addition loops back to step 505 to await receipt of new data over path 220.

Once the data has been written into the main FIFO 200, and the associated $WP_{MAINFIFO}$ value has been stored into the write pointer FIFO 210, then the main write pointer generation logic 330 will increment the value of $WP_{MANFIFO}$ to identify the location immediately following the new data that has been written into the main FIFO 200 in preparation for receipt of the next block of data over path 220. As will be appreciated, since the amount of data that can be written is variable, the amount by which the $WP_{MAINFIFO}$ value is incremented will be variable.

Similarly, the $WP_{WPFIFO}$ generation logic 350 will increment the value of $WP_{WPFIFO}$ by one location in readiness for storing the next $WP_{MAINFIFO}$ value in the write pointer FIFO 210.

Figure 3B:
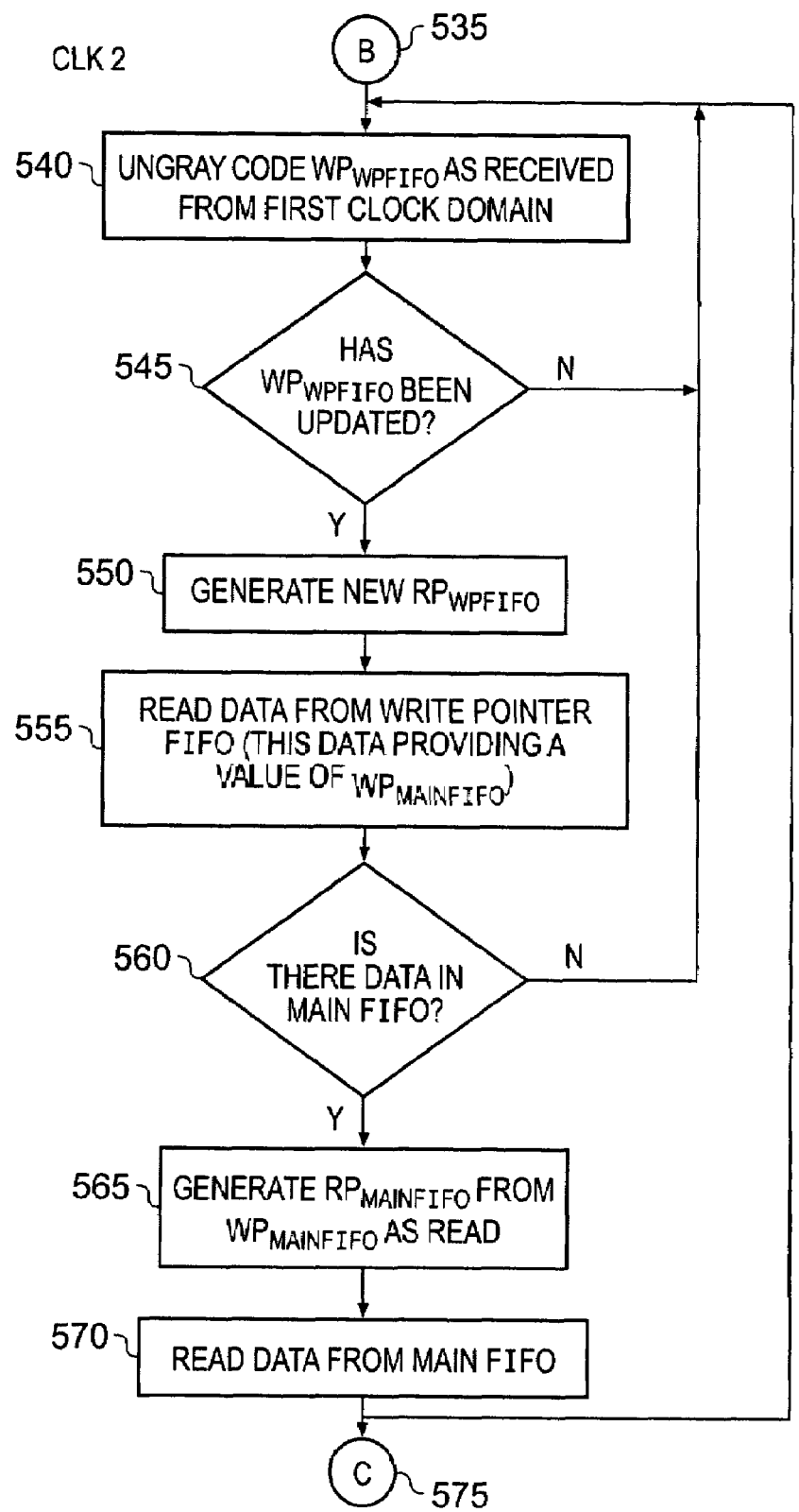

Considering now FIG. 3B, which illustrates a sequence of steps occurring in the second clock domain, the process proceeds from point 535 to step 540, where the ungray coding logic 380 decodes the gray coded $WP_{WPFIFO}$ value as received from the first clock domain in order to produce the value of $WP_{WPFIFO}$ for inputting to the unlike-signed addition logic 365. The process then proceeds to step 545, where the $RP_{WPFIFO}$ generation logic 360 determines whether the value of $WP_{WPFIFO}$ has been updated. This can be determined based on the output from the unlike-signed addition logic 365 which receives at its input the current value of $RP_{WPFIFO}$ and the $WP_{WPFIFO}$ value received from the ungray coding logic 380. In particular, if the value of $RP_{WPFIFO}$ and $WP_{WPFIFO}$ are the same, this will indicate that the $WP_{WPFIFO}$ value has not been updated, and that there is no new data to read from the write pointer FIFO 210. If this is the case, then the process loops back to step 540 to await receipt of a further $WP_{WPFIFO}$ value from the ungray coding logic 380.

However, assuming at step 545 it is determined that the value of $WP_{WPFIFO}$ has been updated, then the process proceeds to step 550, where the $RP_{WPFIFO}$ generation logic 360 generates a new $RP_{WPFIFO}$ value. This will typically be done by incrementing the previous value of $RP_{WPFIFO}$.

Thereafter, at step 555, the new value of $RP_{WPFIFO}$ is input to the multiplexer 315, to cause the relevant data to be read from the write pointer FIFO 210 and output to the unlike-signed addition logic 345. This read data actually provides a value of $WP_{WPFIFO}$.

At step 560, it is then determined by the main write pointer generation logic 340 whether there is any data to be read in the main FIFO 200. As can be seen from FIG. 2, the unlike-signed addition logic 345 receives as one of its inputs the current value of $RP_{MAINFIFO}$, and at its other input the data read from the write pointer FIFO (i.e. a value of $WP_{MAINFIFO}$). If these two values are the same, then this will indicate that there is no data to be read from the main FIFO, and accordingly the process will return to step 540, where the process will wait until there is data in the main FIFO to be read.

Assuming it is determined at step 560 that there is data in the main FIFO to be read, then at step 565 the main write pointer generation logic 340 generates a new value for $RP_{MAINFIFO}$ based on the $WP_{FIFO}$ value as read. Typically, this is done by incrementing the $RP_{MAINFIFO}$ value to indicate a start location for the reading of data. However, the number of bytes of data to be read in any particular cycle from the main FIFO 200 is dependent on how full the main FIFO is, which is indicated by the difference between the $WP_{MAINFIFO}$ value and the $RP_{MAINFIFO}$ value as determined by the output from the unlike-signed addition logic 345. In particular, in one embodiment, it is possible to read between 0 and 4 bytes of data in one cycle depending on how full the main FIFO 200 is. This indication of how many bytes to read is in one embodiment provided as part of the $RP_{MAINFIFO}$ value produced by the main write pointer generation logic 340.

Following step 565, the data is then read from the main FIFO 200 by controlling the multiplexer 305 using the $RP_{MAINFIFO}$ value generated by the main write pointer generation logic 340. The process then returns to step 540 to await receipt by the ungray coding logic 380 of a new gray coded $WP_{WPFIFO}$ value. In addition, the process proceeds to point 575.

Figure 3C:
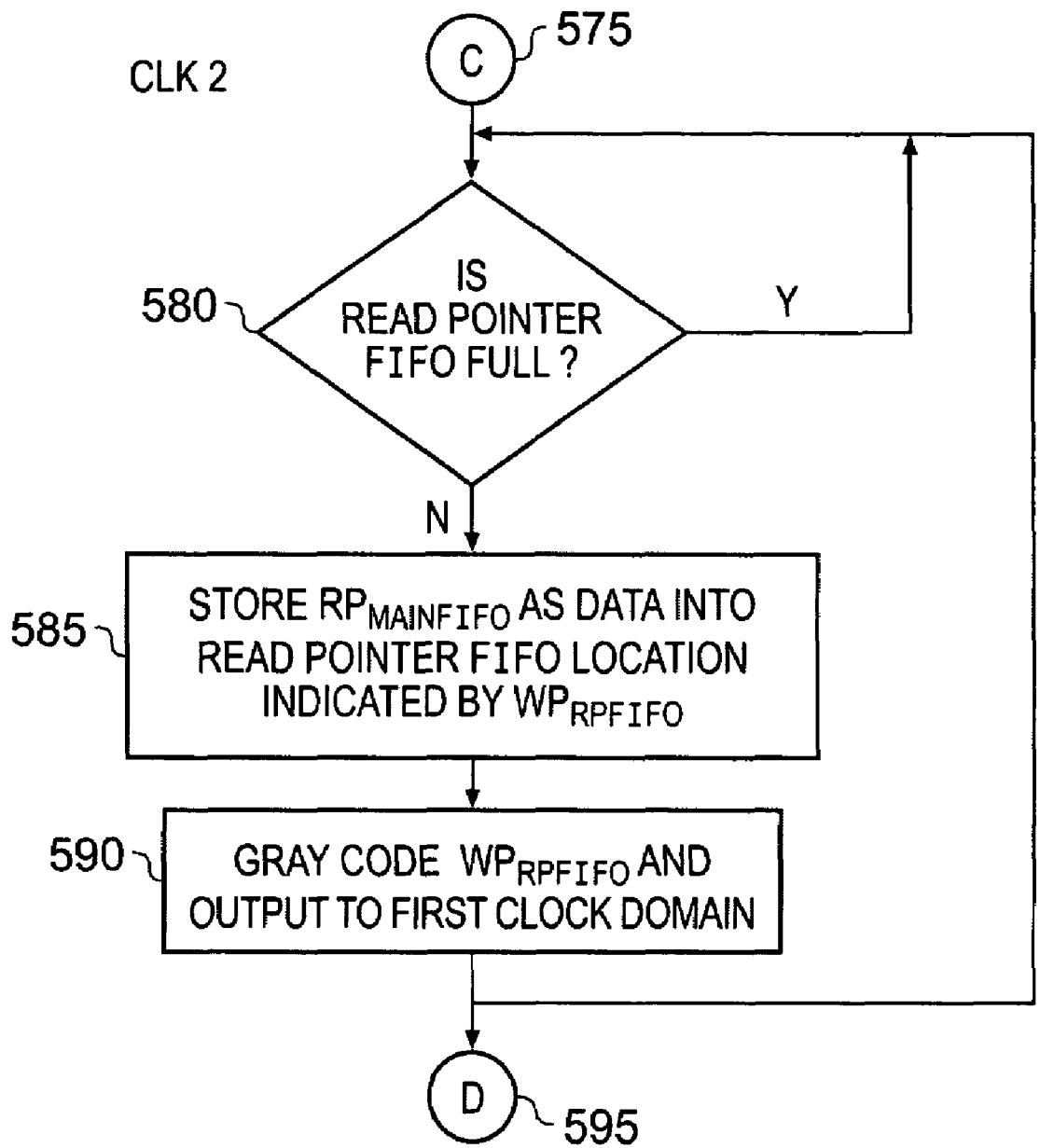

As shown in FIG. 3C, which indicates some further steps performed in the second clock domain, the process proceeds from point 575 to step 580, where the $WP_{RPFIFO}$ generation logic 400 determines whether the read pointer FIFO 205 is full. This determination is made since some write data will now have been received by the read pointer FIFO 205, providing the new value of $RP_{MAINFIFO}$. As can be seen by comparison of the lower portion of FIG. 2 with the upper portion of FIG. 2, the analysis performed by the logic 400, 405 is analogous to that performed by the logic 350, 355 described earlier. In particular, the unlike-signed addition logic 405 receives at its inputs the current $WP_{RPFIFO}$ value, and a current $RP_{RPFIFO}$ value as returned from the first clock domain to the second clock domain via the gray coding logic 435, metastability synchronisation registers 440 and ungray coding logic 445. Assuming it is determined by the $WP_{RPFIFO}$ generation logic 400 that the read pointer FIFO is not full, then the process proceeds to step 585, where the $RP_{MAINFIFO}$ value is stored into one of the registers 320 of the read pointer FIFO 205 at a location indicated by the value of $WP_{RPFIFO}$ generated by the $WP_{RPFIFO}$ generation logic 400. This $WP_{RPFIFO}$ value is then also routed to the gray coding logic 420, where at step 590 it is gray coded and output to the metastability synchronisation registers 425.

At this point, the value of $WP_{RPFIFO}$ can be incremented in preparation for receipt of the next write data value, and the $RP_{MAINFIFO}$ value can be incremented by an amount dependent on the number of bytes read from the main FIFO 200. The process then returns to step 580 and also proceeds to point D 595.

Figure 3D:
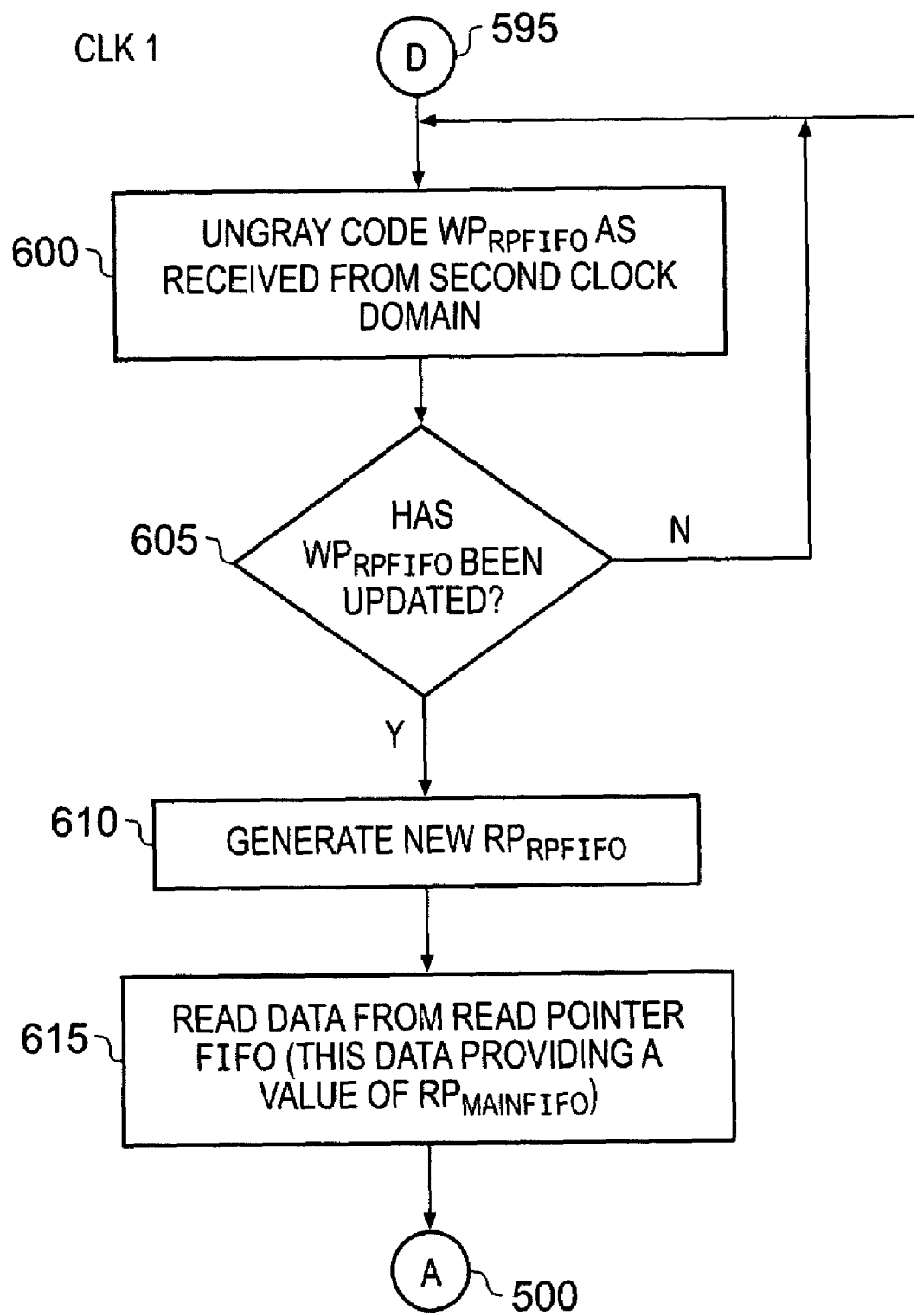

As shown in FIG. 3D, which shows a sequence of steps performed in the first clock domain, the ungray coding logic 430 then decodes the gray coded $WP_{RPFIFO}$ value as received from the second clock domain, and outputs that value as an input to the unlike-signed addition logic 415. Then, at step 605, it is determined whether the $WP_{RPFIFO}$ value has been updated. This determination is made by the $RP_{RPFIFO}$ generation logic 410 based on the output from the unlike-signed addition logic 415, in an analogous way to the determination made by the $RP_{WPFIFO}$ generation logic 360 discussed earlier. If the $WP_{RPFIFO}$ is determined not to have been updated, then this indicates that there is no data to be read from the read pointer FIFO 205, and the process returns to step 600. However, assuming it is determined that the $WP_{RPFIFO}$ value has been updated, then the process proceeds to step 610, where a new $RP_{RPFIFO}$ value is generated by the $RP_{RPFIFO}$ generation logic 410. This value will typically be an incremented version of the previous value. Then, the process proceeds to step 615, where the $RP_{RPFIFO}$ value generated at step 610 is used to control the multiplexer 325 to read data from the read pointer FIFO 205, this data providing a value of $RP_{MAINFIFO}$ for inputting to the unlike-signed addition logic 335. The process then proceeds to point 500, which is the starting point for FIG. 3A.

It will be appreciated that the new asynchronous FIFO apparatus as discussed above with reference to FIGS. 1 to 3 may be used in a variety of instances where it is required to pass data in a data processing apparatus between two asynchronous clock domains. An illustrative example of a data processing apparatus in which this new asynchronous FIFO apparatus can be used is illustrated in FIG. 4.

Figure 4:
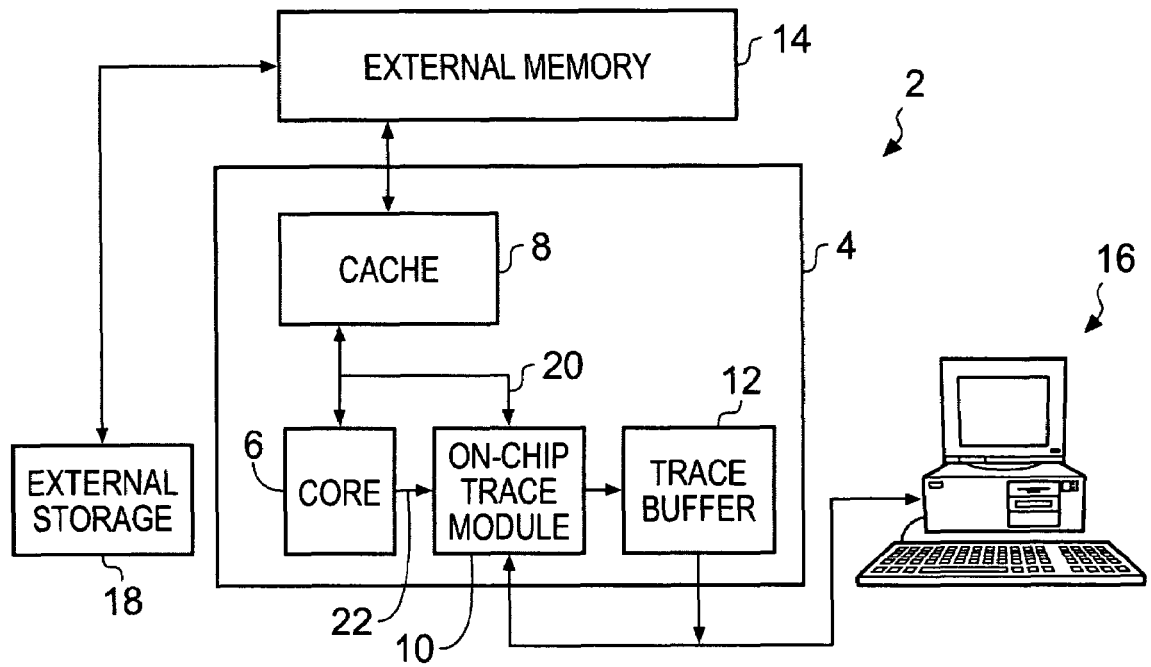
FIG. 4 is a block diagram illustrating a data processing apparatus incorporating an on-chip trace module in which the asynchronous FIFO apparatus of one embodiment of the present invention may be employed.

FIG. 4 schematically illustrates a data processing system 2 providing an on-chip tracing mechanism. An integrated circuit 4 includes a microprocessor core 6, a cache memory 8, an on-chip trace module 10 and an on-chip trace buffer 12. The integrated circuit 4 is connected to an external memory 14 which is accessed when a cache miss occurs within the cache memory 8. A general purpose computer 16 is coupled to the on-chip trace module 10 and the on-chip trace buffer 12 and serves to recover and analyse a stream of tracing data from these elements using software executing upon the general purpose computer 16.

It is often the case that the processor core 6 may, during operation, need to access more data processing instructions and data than there is actually space for in the external memory 14. For example, the external memory 14 may have a size of 1 MB, whereas the processor core 6 might typically be able to specify 32-bit addresses, thereby enabling 4 GB of instructions and data to be specified. Accordingly, all of the instructions and data required by the processor core 6 are stored within external storage 18, for example a hard disk, and then when the processor core 6 is to operate in a particular state of operation, the relevant instructions and data for that state of operation are loaded into the external memory 14.

Figure 5:
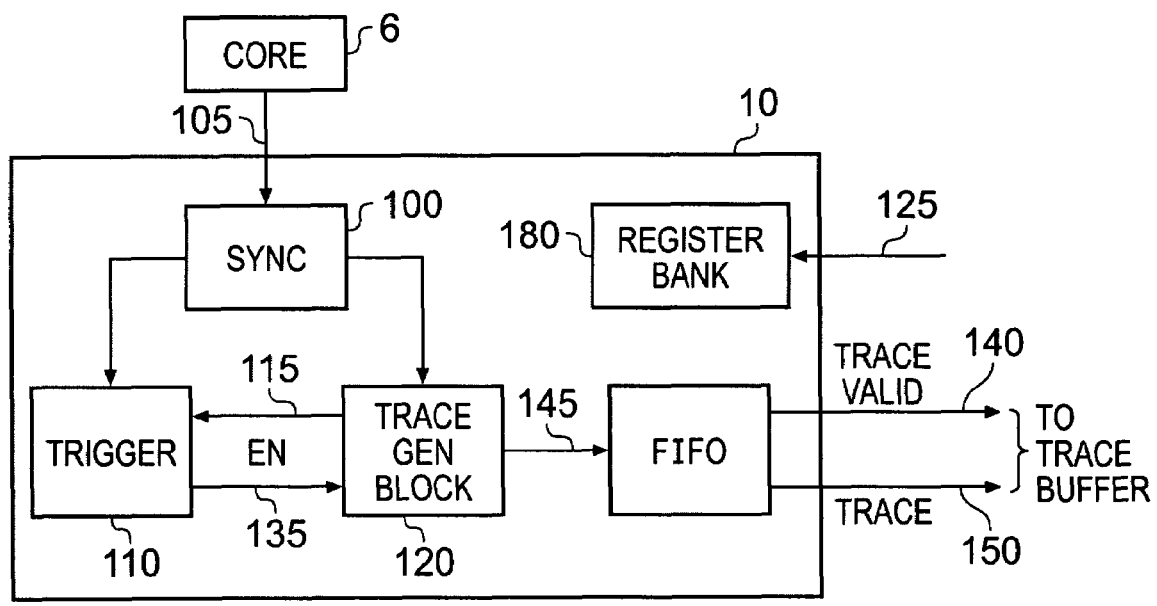
FIG. 5 is a diagram illustrating in more detail the structure of the on-chip trace module of FIG. 4.

FIG. 5 is a block diagram illustrating in more detail the components provided within the on-chip trace module of FIG. 4. The on-chip trace module 10 is arranged to receive over path 105 data indicative of the processing being performed by the processor core 6. With reference to FIG. 4, this may be received from the bus 20 connecting the core 6, cache 8, and on-chip trace-module 10 (such data for example indicating instructions and/or data presented to the core 6, and data generated by the core), along with additional control-type data received directly from the core over bus 22 (for example, an indication that the instruction address is being indexed, an indication that a certain instruction failed its condition codes for some reason, etc). As will be appreciated by those skilled in the art, in certain embodiments both types of data could be passed to the trade module 10 over a single bus between the trace module 10 and the core 6 (rather than using two buses 20, 22).

The sync logic 100 is arranged to convert the incoming signals into internal versions of the signals more appropriate for use within the on-chip trace module. These internal versions are then sent to the trigger 110 and the trace generation block 120, although it will be appreciated that the trigger 110 and the trace generation block 120 will not necessarily need to receive the same signals. Fundamentally, the trigger 110 needs to receive data relating to triggerable events, for example instruction addresses, data values, register accesses, etc. The trace generation block 120 needs to receive any data that would need to be traced dependent on the enable signals issued by the trigger 110. The on-chip trace module 10 further incorporates a register bank 180 which is arranged to receive configuration information over path 125 from the general purpose computer 16, whose contents can be read by the components of the on-chip trace module 10 as required.

Whenever the trigger 110 detects events which should give rise to the generation of a trace stream, it sends an enable signal over path 135 to the trace generation logic 120 to turn the trace on and off. The trace generation logic reacts accordingly by outputting the necessary trace data to the FIFO 130 over path 145. It will be appreciated that a variety of enable signals may be provided over path 135, to identify the type of signals which should be traced, for example trace only instructions, trace instructions and data, etc.

The trace signals are then drained through an output trace port from the FIFO 130 to the trace buffer 12 via path 150. Typically, any trace signals issued over path 150 to the trace buffer are also accompanied by trace valid signals over path 140 indicating whether the output trace is valid or not. A trace valid signal would typically be set to invalid if the associated trace module has no trace data to issue in that clock cycle.

In one embodiment of the present invention, the FIFO 130 may take the form of that FIFO apparatus described earlier with reference to FIG. 2. This can be useful, for example, if the integrated circuit 4 has asynchronous clock domains provided therein, such as would for example be the case if Intelligent Energy Management (IEM) techniques were employed, where the voltage supply to particular components of a data processing apparatus may be reduced during periods of inactivity in order to save energy consumption within the data processing apparatus. Since trace data by its nature is often quite bursty, it cannot be guaranteed that the same number of bits of trace data will be written per clock cycle into the FIFO 130, and hence the use of a FIFO apparatus as discussed earlier with reference to FIG. 2 allows the trace data to continue to be stored and read out correctly even in the presence of asynchronous clock domains between the core 6 and trace buffer 12.

From the above description of an embodiment of the present invention, it will be appreciated that the asynchronous FIFO apparatus described herein enables data to be passed between a first clock domain and an asynchronous second clock domain in situations where in at least one of the two clock domains the amount of data accessible per clock cycle in the FIFO apparatus is variable. This will be particularly beneficial in forthcoming data processing apparatus designs, where it is becoming more and more common for different asynchronous clock domains to exist within the same data processing apparatus.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. An apparatus for performing a correlation with respect to a received signal, the apparatus comprising:
   a first correlation arrangement that correlates for a primary synchronization code in the received signal to produce a first correlated signal;
   a second correlation arrangement that correlates for a secondary synchronization code in the received signal to produce a second correlated signal; and
   logic that derives a frequency adjustment signal from the first correlated signal and combines the frequency adjustment signal with the second correlated signal to reduce a frequency offset in the second correlated signal.

2. The apparatus set forth in claim 1, further comprising:
a frequency adjustment block that receives the first correlated signal and produces the frequency adjustment signal.

3. The apparatus set forth in claim 2, wherein the frequency adjustment block comprises a primary synchronization code ("PSC") frequency adjustment block.

4. The apparatus set forth in claim 1, wherein the first correlation arrangement includes primary synchronization code ("PSC") correlators.

5. The apparatus set forth in claim 1, wherein the secondary correlation arrangement includes secondary synchronization code ("SSC") b correlators.

6. The apparatus set forth in claim 1, wherein the primary synchronization code corresponds to an a sequence of a Primary SCH channel.

7. The apparatus set forth in claim 1, wherein the secondary synchronization code corresponds to a b sequence of a Secondary SCH channel.

8. The apparatus set forth in claim 1, wherein the apparatus comprises a portion of a code division multiple access receiver.

9. The apparatus set forth in claim 1, wherein the apparatus comprises a portion of a receiver that complies with the Universal Mobile Telecommunications System ("UMTS") Wideband Code Division Multiple Access ("WCDMA") standard.

10. A code division multiple access ("CDMA") receiver that receives a CDMA signal, the CDMA receiver comprising:
an analog-to-digital converter that receives a CDMA signal and converts the CDMA signal into a digital signal:
a matched filter that filters the digital signal to produce a filtered digital signal;
a tapped delay line that receives the filtered digital signal and produces a delayed filtered digital signal; and
a cell search block, comprising:
a first correlation arrangement that correlates at least a portion of the delayed filtered digital signal for a primary synchronization code in the received signal to produce a first correlated signal;
a second correlation arrangement that correlates at least a portion of the delayed filtered digital signal for a secondary synchronization code in the received signal to produce a second correlated signal; and
logic that derives a frequency adjustment signal from the first correlated signal and combines the frequency adjustment signal with the second correlated signal to reduce a frequency offset in the second correlated signal.

11. The CDMA receiver set forth in claim 10, further comprising:
a frequency adjustment block that receives the first correlated signal and produces the frequency adjustment signal.

12. The CDMA receiver set forth in claim 11, wherein the frequency adjustment block comprises a primary synchronization code ("PSC") frequency adjustment block.

13. The CDMA receiver set forth in claim 10, wherein the first correlation arrangement includes primary synchronization code ("PSC") correlators.

14. The CDMA receiver set forth in claim 10, wherein the second correlation arrangement includes secondary synchronization code ("SSC") b correlators.

15. A method of performing a correlation with respect to a received signal, comprising:
correlating against a primary synchronization code of the received signal to produce a first correlated signal;
correlating against a secondary synchronization code of the received signal to produce a second correlated signal;
deriving a frequency adjustment factor from the first correlated signal;
combining the frequency adjustment factor with the second correlated signal to reduce a frequency offset in the second correlated sianal.

16. The method set forth in claim 15, wherein the primary synchronization code corresponds to an a sequence of a Primary SCH channel.

17. The method set forth in claim 15, wherein the secondary synchronization code corresponds to a b sequence of a Secondary SCH channel.

18. The method set forth in claim 15, further comprising the step of:
determining the complex conjugate of an imaginary portion of the first correlated signal.

19. The method set forth in claim 15, further comprising the step of:
multiplying the first correlated signal by a primary synchronization code sequence to derive the frequency adjustment factor.

20. The method set forth in claim 19, further comprising the step of:
determining the complex conjugate of an imaginary portion of the first correlated signal to form an imaginary portion of the frequency adjustment factor.

* * * * *

UNITED STATES PATENT AND TRADEMARK OFFICE
CERTIFICATE OF CORRECTION

| | |
|---|---|
| PATENT NO. | : 7,315,600 B2 |
| APPLICATION NO. | : 10/812310 |
| DATED | : January 1, 2008 |
| INVENTOR(S) | : Sigurdsson et al. |

It is certified that error appears in the above-identified patent and that said Letters Patent is hereby corrected as shown below:

IN THE CLAIMS

Please replace the claims in their entirety, beginning at Column 12, line 55 through Column 14, with the following set of claims:

1. An asynchronous FIFO apparatus for a data processing apparatus having a first clock domain and a second clock domain, the first clock domain being asynchronous with respect to the second clock domain, the asynchronous FIFO apparatus being operable to pass data between the first clock domain and the second clock domain and comprising:
    a main FIFO memory operable to store said data to be passed between the first clock domain and the second clock domain, the main FIFO memory being accessible from each of the first clock domain and the second clock domain under the control of an access pointer associated with that clock domain, for one of said first and second clock domains the amount of data accessible per clock cycle being variable;
    an auxiliary FIFO memory associated with said one of said first and second clock domains and operable to store the access pointer used to access the main FIFO memory from that clock domain, the access pointer being stored at a location of the auxiliary FIFO memory specified by an auxiliary access pointer; and
    routing logic operable to pass the auxiliary access pointer to the other of said first and second clock domains to enable that other of the first and second clock domains to retrieve the access pointer stored in the auxiliary FIFO memory.

2. An asynchronous FIFO apparatus as claimed in claim 1, wherein the routing logic performs a coding on the auxiliary access pointer in order to generate a coded auxiliary access pointer for passing to the other of said first and second clock domains.

3. An asynchronous FIFO apparatus as claimed in claim 2, wherein the routing logic performs a gray coding operation on the auxiliary access pointer in order to generate a gray coded auxiliary access pointer.

UNITED STATES PATENT AND TRADEMARK OFFICE
CERTIFICATE OF CORRECTION

| | |
|---|---|
| PATENT NO. | : 7,315,600 B2 |
| APPLICATION NO. | : 10/812310 |
| DATED | : January 1, 2008 |
| INVENTOR(S) | : Sigurdsson et al. |

It is certified that error appears in the above-identified patent and that said Letters Patent is hereby corrected as shown below:

4. An asynchronous FIFO apparatus as claimed in claim 1, wherein the main FIFO memory is accessible from the first clock domain under the control of a write access pointer in order to write data into the main FIFO memory, and the main FIFO memory is accessible from the second clock domain under the control of a read access pointer in order to read data from the main FIFO memory.

5. An asynchronous FIFO apparatus as claimed in claim 4, wherein:
for said first clock domain the amount of data writeable into the main FIFO memory per clock cycle is variable;
the auxiliary FIFO memory is a write pointer FIFO memory operable to store the write access pointer used to access the main FIFO memory from the first clock domain; and
the routing logic is operable to pass the auxiliary access pointer to the second clock domain to enable the second clock domain to retrieve the write access pointer stored in the write pointer FIFO memory;
the asynchronous FIFO apparatus further comprising read logic in the second clock domain and operable in response to the write access pointer to cause the associated data stored in the main FIFO memory to be read.

6. An asynchronous FIFO apparatus as claimed in claim 4, wherein:
for said second clock domain the amount of data readable from the main FIFO memory per clock cycle is variable;
the auxiliary FIFO memory is a read pointer FIFO memory operable to store the read access pointer used to access the main FIFO memory from the second clock domain; and
the routing logic is operable to pass the auxiliary access pointer to the first clock domain to enable the first clock domain to retrieve the read access pointer stored in the read pointer FIFO memory;
the asynchronous FIFO apparatus further comprising write control logic in the first clock domain and operable in response to the read access pointer to determine whether the main FIFO memory is full.

UNITED STATES PATENT AND TRADEMARK OFFICE
CERTIFICATE OF CORRECTION

| | | |
|---|---|---|
| PATENT NO. | : 7,315,600 B2 | Page 3 of 7 |
| APPLICATION NO. | : 10/812310 | |
| DATED | : January 1, 2008 | |
| INVENTOR(S) | : Sigurdsson et al. | |

It is certified that error appears in the above-identified patent and that said Letters Patent is hereby corrected as shown below:

7. An asynchronous FIFO apparatus as claimed in claim 4, wherein:
    for both of said first and second clock domains the amount of data accessible per clock cycle is variable, the auxiliary FIFO memory comprising first and second auxiliary FIFO memories, each with associated routing logic;
    the first auxiliary FIFO memory being a write pointer FIFO memory operable to store the write access pointer used to access the main FIFO memory from the first clock domain, and its associated routing logic being operable to pass the auxiliary access pointer of the write pointer FIFO memory to the second clock domain to enable the second clock domain to retrieve the write access pointer stored in the write pointer FIFO memory;
    the asynchronous FIFO apparatus further comprising read logic in the second clock domain and operable in response to the write access pointer to cause the associated data stored in the main FIFO memory to be read;
    the second auxiliary FIFO memory being a read pointer FIFO memory operable to store the read access pointer used to access the main FIFO memory from the second clock domain, and its associated routing logic being operable to pass the auxiliary access pointer of the read pointer FIFO memory to the first clock domain to enable the first clock domain to retrieve the read access pointer stored in the read pointer FIFO memory;
    the asynchronous FIFO apparatus further comprising write control logic in the first clock domain and operable in response to the read access pointer to determine whether the main FIFO memory is full.

8. A data processing apparatus comprising:
    a first element operating in a first clock domain;
    a second element operating in a second clock domain; and
    an asynchronous FIFO apparatus as claimed in claim 1, operable to pass data between the first element and the second element.

9. A data processing apparatus as claimed in claim 8, further comprising:
    a trace module operable to produce trace data indicative of the activity of the first element, the trace module including said asynchronous FIFO apparatus;
    wherein the main FIFO memory is accessible from the first clock domain under the control of a write access pointer in order to write into the main FIFO memory the trace data, and the main FIFO memory is accessible from the second clock domain under the control of a read access pointer in order to read from the main FIFO memory the trace data for passing to the second element.

UNITED STATES PATENT AND TRADEMARK OFFICE
CERTIFICATE OF CORRECTION

| | |
|---|---|
| PATENT NO. | : 7,315,600 B2 |
| APPLICATION NO. | : 10/812310 |
| DATED | : January 1, 2008 |
| INVENTOR(S) | : Sigurdsson et al. |

It is certified that error appears in the above-identified patent and that said Letters Patent is hereby corrected as shown below:

10. A data processing apparatus as claimed in claim 9, wherein a power supply voltage to the first element is variable, and a clock frequency of the first clock domain is operable to change in dependence on the power supply voltage.

11. A method of passing data between a first clock domain and a second clock domain of a data processing apparatus, the first clock domain being asynchronous with respect to the second clock domain, the method comprising the steps of:
 (a) storing within a main FIFO memory said data to be passed between the first clock domain and the second clock domain, the main FIFO memory being accessible from each of the first clock domain and the second clock domain under the control of an access pointer associated with that clock domain, for one of said first and second clock domains the amount of data accessible per clock cycle being variable;
 (b) storing with an auxiliary FIFO memory associated with said one of said first and second clock domains the access pointer used to access the main FIFO memory from that clock domain, the access pointer being stored at a location of the auxiliary FIFO memory specified by an auxiliary access pointer;
 (c) passing the auxiliary access pointer to the other of said first and second clock domains; and
 (d) retrieving, at the other of the first and second clock domains, the access pointer stored in the auxiliary FIFO memory.

12. A method as claimed in claim 11, further comprising the step, prior to said step (c) of performing a coding on the auxiliary access pointer in order to generate a coded auxiliary access pointer for passing at said step (c) to the other of said first and second clock domains.

13. A method as claimed in claim 12, wherein said step of performing a coding comprises the step of performing a gray coding operation on the auxiliary access pointer in order to generate a gray coded auxiliary access pointer.

UNITED STATES PATENT AND TRADEMARK OFFICE
CERTIFICATE OF CORRECTION

| | |
|---|---|
| PATENT NO. | : 7,315,600 B2 |
| APPLICATION NO. | : 10/812310 |
| DATED | : January 1, 2008 |
| INVENTOR(S) | : Sigurdsson et al. |

It is certified that error appears in the above-identified patent and that said Letters Patent is hereby corrected as shown below:

14. A method as claimed in claim 11, wherein the main FIFO memory is accessible from the first clock domain under the control of a write access pointer in order to write data into the main FIFO memory, and the main FIFO memory is accessible from the second clock domain under the control of a read access pointer in order to read data from the main FIFO memory.

15. A method as claimed in claim 14, wherein:
    for said first clock domain the amount of data writeable into the main FIFO memory per clock cycle is variable;
    the auxiliary FIFO memory is a write pointer FIFO memory operable to store at said step (b) the write access pointer used to access the main FIFO memory from the first clock domain;
    said step (c) comprises the step of passing the auxiliary access pointer to the second clock domain;
    said step (d) comprises the step of retrieving, at the second clock domain, the write access pointer stored in the write pointer FIFO memory; and
    the method further comprises the step, in the second clock domain, of reading from the main FIFO memory, in response to the write access pointer, the associated data stored in the main FIFO memory.

16. A method as claimed in claim 14, wherein:
    for said second clock domain the amount of data readable from the main FIFO memory per clock cycle is variable;
    the auxiliary FIFO memory is a read pointer FIFO memory operable to store at said step (b) the read access pointer used to access the main FIFO memory from the second clock domain;
    said step (c) comprises the step of passing the auxiliary access pointer to the first clock domain;
    said step (d) comprises the step of retrieving, at the first clock domain, the read access pointer stored in the read pointer FIFO memory; and
    the method further comprises the step, in the first clock domain, of determining, in response to the read access pointer, whether the main FIFO memory is full.

UNITED STATES PATENT AND TRADEMARK OFFICE
CERTIFICATE OF CORRECTION

| | |
|---|---|
| PATENT NO. | : 7,315,600 B2 |
| APPLICATION NO. | : 10/812310 |
| DATED | : January 1, 2008 |
| INVENTOR(S) | : Sigurdsson et al. |

It is certified that error appears in the above-identified patent and that said Letters Patent is hereby corrected as shown below:

17. A method as claimed in claim 14, wherein:
for both of said first and second clock domains the amount of data accessible per clock cycle is variable, the auxiliary FIFO memory comprising first and second auxiliary FIFO memories, and said steps (b), (c) and (d) being performed for each auxiliary FIFO memory;
the first auxiliary FIFO memory being a write pointer FIFO memory operable to store at said step (b) the write access pointer used to access the main FIFO memory from the first clock domain, said associated step (c) comprising the step of passing the auxiliary access pointer to the second clock domain, and said associated step (d) comprising the step of retrieving, at the second clock domain, the write access pointer stored in the write pointer FIFO memory; and
the method further comprising the step, in the second clock domain, of reading from the main FIFO memory, in response to the write access pointer, the associated data stored in the main FIFO memory;
the second auxiliary FIFO memory being a read pointer FIFO memory operable to store at said step (b) the read access pointer used to access the main FIFO memory from the second clock domain, said associated step (c) comprising the step of passing the auxiliary access pointer to the first clock domain, said associated step (d) comprising the step of retrieving, at the first clock domain, the read access pointer stored in the read pointer FIFO memory; and
the method further comprising the step, in the first clock domain, of determining, in response to the read access pointer, whether the main FIFO memory is full.

18. A method of operating a data processing apparatus, comprising the steps of:
providing a first element operating in a first clock domain;
providing a second element operating in a second clock domain; and
performing a method as claimed in claim 11 to pass data between the first element and the second element.

UNITED STATES PATENT AND TRADEMARK OFFICE
CERTIFICATE OF CORRECTION

| | |
|---|---|
| PATENT NO. | : 7,315,600 B2 |
| APPLICATION NO. | : 10/812310 |
| DATED | : January 1, 2008 |
| INVENTOR(S) | : Sigurdsson et al. |

It is certified that error appears in the above-identified patent and that said Letters Patent is hereby corrected as shown below:

19. A method as claimed in claim 18, further comprising the step of:
employing a trace module to produce trace data indicative of the activity of the first element, the method being performed within the trace module;
wherein the main FIFO memory is accessible from the first clock domain under the control of a write access pointer in order to write into the main FIFO memory the trace data, and the main FIFO memory is accessible from the second clock domain under the control of a read access pointer in order to read from the main FIFO memory the trace data for passing to the second element.

20. A method as claimed in claim 19, further comprising the step of varying a power supply voltage to the first element, a clock frequency of the first clock domain changing in dependence on the power supply voltage.

Signed and Sealed this

Fourth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,315,600 B2
APPLICATION NO. : 10/812310
DATED : January 1, 2008
INVENTOR(S) : Sigurdsson et al.

Page 1 of 1

It is certified that error appears in the above-identified patent and that said Letters Patent is hereby corrected as shown below:

Title page and col. 1, the Title should read:

AN ASYNCHRONOUS FIFO APPARATUS AND METHOD FOR PASSING DATA BETWEEN A FIRST CLOCK DOMAIN AND A SECOND CLOCK DOMAIN OF A DATA PROCESSING APPARATUS

Signed and Sealed this

Tenth Day of June, 2008

JON W. DUDAS
*Director of the United States Patent and Trademark Office*